April 22, 1952 — L. M. GOLDSMITH — 2,594,152
PRESSURE-RELIEF APPARATUS
Filed Dec. 14, 1946
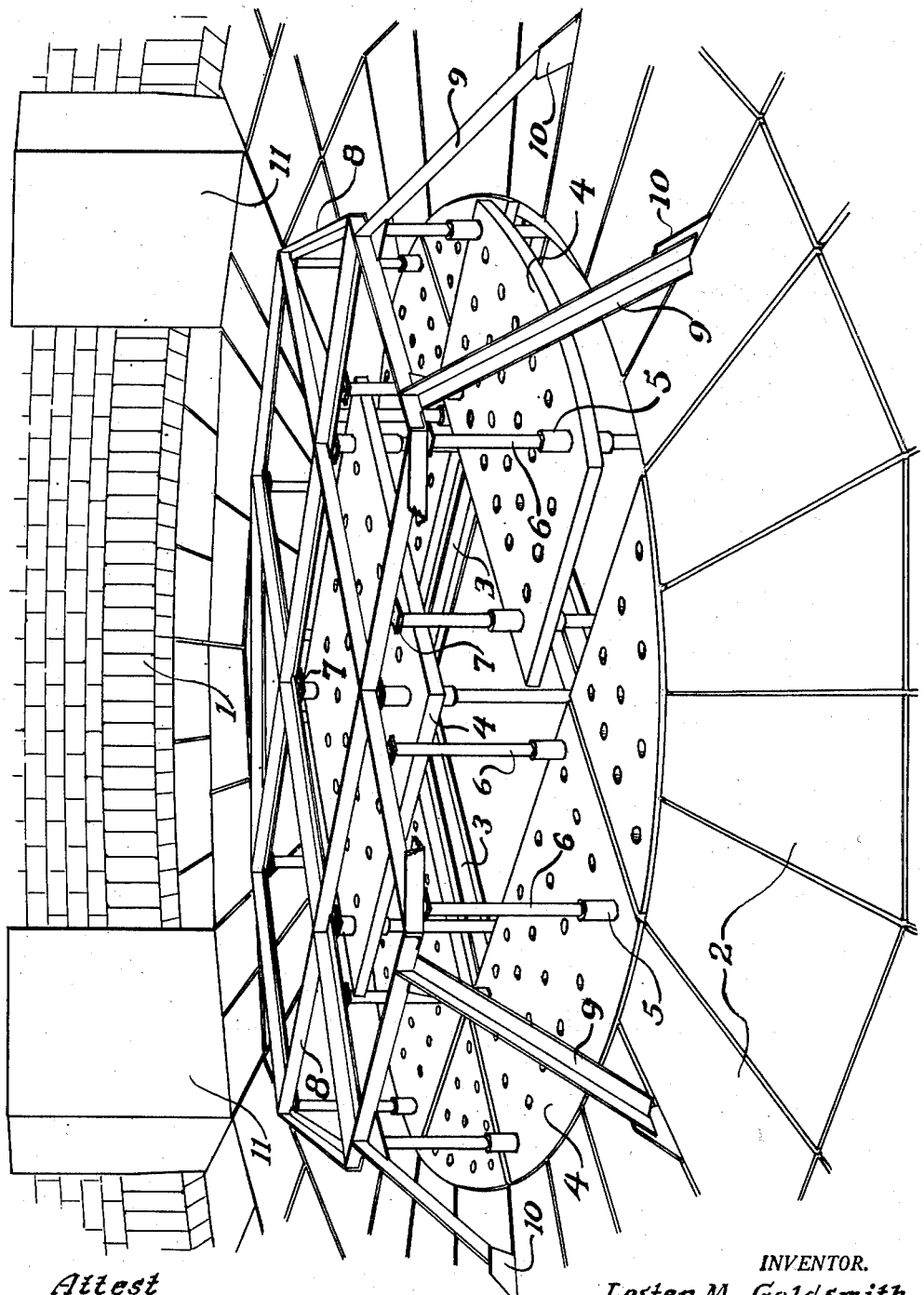
Attest
Robert T. Staples
INVENTOR.
Lester M. Goldsmith
BY Norbert E. Birch
Attorney Patented Apr. 22, 1952

2,594,152

UNITED STATES PATENT OFFICE 2,594,152

PRESSURE-RELIEF APPARATUS

Lester M. Goldsmith, Philadelphia, Pa., assignor to The Atlantic Refining Company, Philadelphia, Pa., a corporation of Pennsylvania Application December 14, 1946, Serial No. 716,411

6 Claims. (Cl. 23—288)

The invention relates to improvements in pressure relief apparatus and, more particularly, to improvements in that type of pressure relief apparatus useful in connection with the catalyst regenerator of a fluid catalytic cracking unit.

In the fluid catalytic cracking of a hydrocarbon oil, a stream of vaporized oil and powdered catalyst is injected into a reactor where the oil is cracked, the cracked vapors being removed from the top of the reactor, and the spent catalyst containing carbonaceous deposits and traces of oil being withdrawn from the bottom of the reactor. The spent catalyst is then steam-stripped to remove the oil prior to thermal regeneration.

In order to regenerate or reactivate the spent catalyst, it is admixed with air at elevated temperature and injected into a regenerating chamber. The regenerating chamber comprises a cylindrical metal vessel provided with conical ends, the lower cone being connected to the spent catalyst-air inlet conduit, and the upper cone being connected with a combustion gas discharge conduit, the entire regenerating chamber being lined with fire brick. A perforated floor or grid is disposed horizontally within the regenerator and covers the entire cross-section of the regenerator above the lower cone. The purpose of the perforated grid is to create a pressure differential between the cone beneath the grid and the main volume of the regenerator above the grid by restricting flow through the grid and obtaining a uniform distribution of spent catalyst and air over the cross-section of the regenerator. Regenerators of this general type are disclosed in U. S. Patents 2,404,071 to Jahnig and U. S. 2,396,109 and 2,399,050 to Martin. In the regenerator, combustion takes place in the "fluidized" mixture of spent catalyst and air, and the carbonaceous material is burned from the catalyst particles. Regenerated catalyst is removed from the regenerator by means of one or more ducts provided within the side wall thereof. Combustion gases resulting from the regeneration are withdrawn from the top of the regenerator, stripped of entrained catalyst particles, and vented.

It has been customary to fasten down the individual sections of the distributing grid by means of bolts or specially designed clips. In operation, however, due to certain disturbances occurring beneath the grid which create an increased pressure on the under surfaces of the grid, the grid plates have been torn away from the supporting structure, thereby occasioning a reduction in the pressure drop across the grid, resultant poor distribution of catalyst over the cross section of the regenerator, and an attendant reduction in efficiency.

It is, therefore, an object of the invention to provide means for relieving pressure upon the grid plates in the regenerator of a fluid catalytic cracking unit.

It is a further object of the invention to provide means for relieving pressure, such means being displaceable by unusual conditions and returnable to the original position when such unusual conditions have been removed.

Other objects of the invention will be apparent from the description and claims which follow.

In the drawing, like numerals are used to designate like parts.

The drawing is a perspective view of the device shown with a portion thereof broken away and, for purposes of clarity, with certain of the pressure relief means shown in their operative position.

In the drawing is shown a portion of the interior of a regenerator of a catalytic cracking unit. Such regenerator comprises a cylindrical metal shell lined with fire brick 1, and provided with a grid, the latter comprising a plurality of plates 2 varying in size and shape and rigidly fastened in place by bolts, clips, or other suitable means (not shown) to supporting structure 3 such as I-beams or the like extending inwardly from the wall of the regenerator. It will be noted that for purposes of simplicity, only the central portion of the grid has been shown as perforated. In practice the entire grid is perforated for reasons that will hereinafter be made apparent. Likewise, for simplicity, the upper and lower cones capping the top and bottom of the regenerator, respectively, have been omitted, since such structure is conventional and forms no part of the present invention.

The central portion of the grid comprises a plurality of vertically movable plates 4, each plate being provided with a plurality of vertical collars 5, preferably one collar in each corner of each plate, said collars extending through said plates and being rigidly affixed thereto, for example, by welding, or other suitable means. A plurality of guide rods 6 are rigidly affixed at their lower ends to supporting structure 3 and extend upwardly through collars 5, said collars and said rods being in slidable relationship.

The upper ends of rods 6 are provided with plates 7 adapted to provide increased area for the support of framework 8, which is affixed thereto by welding, or by other suitable means. Framework 8 functions to maintain guide rods 6 in proper alignment. Rods 6 are preferably of sufficient length to permit plates 4 to rise without coming into contact with framework 8, and only under exceptional conditions would such framework function to limit the upward travel of the plates. Framework 8 is further supported and braced by diagonal members 9 affixed to vertical plates 10 which, in turn, may be welded to the grid or may extend through the grid to supporting structure 3 therebeneath. Framework 8, as well as diagonal members 9, may be constructed of angle iron, as shown, or from iron or other metal of any desired cross section.

Further provided within the regenerator are ducts 11, the purpose of which will be hereinafter described.

It will be understood that, while the drawing and the description above set forth represent a preferred embodiment of the invention, certain changes and variations can readily be made without departing from the scope of the appended claims. For example, any desired number of guide rods 6 may be used in connection with each movable plate 4, the only limitation being the necessity for slidably keying the collar to the rod to prevent swiveling of the plate in case only one rod is used. While it is desirable to employ rods of circular cross section, other rods may be utilized having triangular, square, pentagonal, hexagonal, or any other cross section capable of preventing rotary displacement between the plate and the rod.

The operation of the device is as follows:

As hereinbefore described, the spent catalyst is admixed with air at elevated temperature and injected into the regenerator through the lower cone thereof (not shown) and thence through the grid thereof, such grid being perforated over its entire area to insure distribution of the catalyst-air mixture over the entire cross section of the regenerator. The catalyst-air mixture comprises a dense, turbulent phase or layer occupying the lower section of the regenerator immediately above the grid, and extending upwardly to at least, and at times above, the top of ducts 11. Combustion takes place removing the carbonaceous deposits from the catalyst, such catalyst being thereby regenerated and then removed from the regenerator through ducts 11. Gases resulting from the combustion, and comprising the lean or less dense phase in the regenerator, are substantially freed of catalyst and discharged from the upper cone (not shown) of the regenerator.

In the event of a sudden increase in pressure beneath the grid, movable plates 4 are free to rise, guided by the coaction of collars 5 and guide rods 6, said collars preventing any possibility of binding between plates 4 and rods 6. Framework 8, affixed to the upper ends of rods 6, prevents plates 4 from being projected above the upper ends of such rods and serves the further function of rigidly securing said rods to prevent relative displacement thereof. After the pressure has been relieved through the space provided by the upward movement of plates 4, such plates will return to their normal position, rods 6 acting as guides to keep said plates in alignment. It will readily be understood that the maximum pressure differential to be maintained may be varied by adding weight to, or removing weight from, plates 4.

The example here given and the particular description set forth are merely presented in order to illustrate how the invention may be applied. Other forms and variations coming within the scope of the appended claims will readily suggest themselves to those skilled in the art.

I claim:

1. In combination with a regenerating chamber having a multi-apertured grid extending substantially horizontally over the cross-section thereof and beam members extending inwardly of said chamber beneath said grid and rigidly supporting said grid, means for relieving pressure beneath said grid comprising an opening centrally of said rigidly supported grid, a multi-apertured plate covering said opening and vertically movable with respect thereto, and means for controlling the vertical motion of said plate.

2. In combination with a regenerating chamber having a multi-apertured grid extending substantially horizontally over the cross-section thereof and beam members extending inwardly of said chamber beneath said grid and rigidly supporting said grid, means for relieving pressure beneath said grid comprising an opening centrally of said rigidly supported grid, a multi-apertured plate covering said opening and vertically movable with respect thereto, means for guiding said plate in vertical motion, and means for limiting the extent of said vertical motion.

3. In combination with a regenerating chamber having a multi-apertured grid extending substantially horizontally over the cross-section thereof and beam members extending inwardly of said chamber beneath said grid and rigidly supporting said grid, means for relieving pressure beneath said grid comprising an opening centrally of said rigidly supported grid, a multi-apertured plate covering said opening and vertically movable with respect thereto, a collar affixed to said plate, and a vertical rod slidably extending through said collar, said collar and said rod being adapted to guide said plate in vertical motion.

4. In combination with a regenerating chamber having a multi-apertured grid extending substantially horizontally over the cross-section thereof and beam members extending inwardly of said chamber beneath said grid and rigidly supporting said grid, means for relieving pressure beneath said grid comprising an opening centrally of said rigidly supported grid, a multi-apertured plate covering said opening and vertically movable with respect thereto, a collar affixed to said plate, a vertical rod slidably extending through said collar, said collar and said rod being adapted to guide said plate in vertical motion, and an abutment disposed above said plate for limiting the extent of vertical motion of said plate.

5. In combination with a regenerating chamber having a multi-apertured grid extending substantially horizontally over the cross-section thereof and beam members extending inwardly of said chamber beneath said grid and rigidly supporting said grid, means for relieving pressure beneath said grid comprising an opening centrally of said rigidly supported grid, and a multi-apertured plate covering said opening, said plate being movable vertically a predetermined maximum distance with respect to said rigidly supported grid and returnable to its initial position upon relief of said pressure.

6. In combination with a regenerating chamber having a multi-apertured grid extending substantially horizontally over the cross-section thereof and beam members extending inwardly of said chamber beneath said grid and rigidly supporting said grid, means for relieving pressure beneath said grid comprising an opening centrally of said rigidly supported grid, a multi-apertured plate covering said opening and vertically movable with respect thereto, a plurality of collars associated with said plate, a plurality of rods coacting with said collars to guide said plate in its vertical motion, a framework affixed to the upper ends of said rods for limiting the upward motion of said plate and for maintaining said rods in alignment, and braces for preventing lateral movement of said framework.

LESTER M. GOLDSMITH.

REFERENCES CITED

The following references are of record in the file of this patent:

UNITED STATES PATENTS

| Number | Name | Date |
|---|---|---|
| 1,397,423 | Humphries | Nov. 15, 1921 |
| 2,505,851 | Wobker et al. | May 2, 1950 |

FOREIGN PATENTS

| Number | Country | Date |
|---|---|---|
| 25,336 of 1911 | Great Britain | Aug. 8, 1912 |